UNITED STATES PATENT OFFICE.

JOHN LEONARD KELLOGG, OF BATTLE CREEK, MICHIGAN.

MANUFACTURING POWDERED EXTRACT FOR USE IN THE PREPARATION OF BEVERAGES AND THE LIKE.

1,097,720.
No Drawing.

Specification of Letters Patent. Patented May 26, 1914.

Application filed January 28, 1914. Serial No. 814,924. REISSUED

*To all whom it may concern:*

Be it known that I, JOHN LEONARD KELLOGG, a citizen of the United States, residing at Battle Creek, Michigan, have invented certain new and useful Improvements in Manufacturing Powdered Extracts for Use in the Preparation of Beverages and the like, of which the following is a specification.

This invention relates to an improved process for manufacturing powdered extracts for use in the preparation of beverages and the like.

The object of this invention is to provide a process which will be speedy and effective and produce a product of superior quality.

I accomplish the objects of my invention by the devices and means described in the following specification.

The invention is clearly defined and pointed out in the claims.

In carrying out my invention, I first prepare a mixture of one third ground barley malt and two-thirds corn flour, wheat flour, corn starch, or any other suitable starch material. I take the above mixture and mix it thoroughly with water until it is made into a thick paste. This paste is then placed in a steam cooker or a jacket mixer and heated by means of steam to 160° to 180° F. and kept at this temperature for about two hours. By this step, the diastatic properties of the malt entirely convert the starch in the materials into maltrose or malt sugar. I then place the mass in an inclosed rotary mixing cooker and cook it under about 40 pounds steam pressure for five hours. This serves to partially caramelize the malt sugar formed in the preceding step, and when the mass is drawn from the cooker it is of a dark brown coffee color and has a sweetish bitter flavor. The material is now drawn off from the mixing cooker and thoroughly mixed in an ordinary bakers' bread mixer with bran, malt sprouts, and roasted pulverized rye. After mixing, the product is thoroughly dried in an ordinary steam rotary drier and it is then roasted in an ordinary coffee roaster until it has a rich brown coffee color. This serves to further caramelize the malt sugar. The material is now placed in a cooker and cooked for two hours until all the soluble matter has been extracted from the grain. The mass is then percolated and the soluble extract drawn off, the residue being washed several times until all the soluble extract has been obtained. The soluble extract is collected and evaporated down to a thick syrup by means of ordinary vacuum pans. This thick syrup is then pumped into a rotary vacuum drier and completely evaporated and the resulting material is ground into a granular powder. This granular powder is the final form of the product and the beverage prepared therefrom has the flavor and general characteristics of a good grade of coffee when it is properly made. I use this product to prepare a beverage for instant use by placing a teaspoonful in a cup, pouring over it hot water, thoroughly mixing and adding cream and sugar to suit the taste.

Having thus described my invention, what I claim as new and desire to secure by Letters Patent, is:

1. The process of preparing a powdered beverage extract which consists of preparing a mixture of one part barley malt, two parts of suitable starchy material, and sufficient water to form a thick paste, heating said paste at a temperature of approximately 170° F. until the starch therein is converted into maltose, cooking said material under approximately 40 pounds pressure for about five hours to partially caramelize the maltose therein, mixing the resulting material with bran, malt sprouts and roasted pulverized rye, drying and roasting the same to further caramelize the maltose, percolating the resulting mass, evaporating the soluble extract *in vacuo* and converting the resultant product into a granular powder.

2. The process of preparing a powdered beverage extract which consists of preparing a mixture of one part barley malt, two parts of suitable starchy material, and sufficient water to form a thick paste, heating said paste until the starch therein is converted into maltose, cooking said material under approximately 40 pounds pressure for about five hours to partially caramelize the maltose therein, mixing the resulting material with bran, malt sprouts, and roasted pulverized rye, drying and roasting the same to further caramelize the maltose, percolating the resulting mass, evaporating the soluble extract *in vacuo* and converting the resultant product into a granular powder.

3. The process of preparing a powdered beverage extract which consists of preparing a mixture of one part barley malt, two parts of suitable starchy material, and sufficient water to form a thick paste, heating said paste until the starch therein is converted into maltose, cooking said material to partially caramelize the maltose therein, mixing the resulting material with bran, malt sprouts and roasted pulverized rye, drying and roasting the same to further caramelize the maltose, percolating the resulting mass, evaporating the soluble extract *in vacuo* and converting the resultant product into a granular powder.

4. The process of preparing a powdered beverage extract which consists of preparing a mixture of one part barley malt, two parts of suitable starchy material, and sufficient water to form a thick paste, heating said paste until the starch therein is converted into maltose, cooking said material to partially caramelize the maltose therein, mixing the resulting material with bran, malt sprouts and roasted pulverized rye, drying and roasting the same to further caramelize the maltose, percolating the resulting mass, and evaporating the soluble extract *in vacuo*.

5. The process of preparing a powdered beverage extract which consists of preparing a mixture of barley malt, suitable starchy material, and sufficient water to form a thick paste, heating said paste until the starch therein is converted into maltose, cooking said material to partially caramelize the maltose therein, mixing the resulting material with bran, malt sprouts and roasted pulverized rye, drying and roasting the same to further caramelize the maltose, percolating the resulting mass and evaporating the soluble extract *in vacuo*.

In witness whereof, I have hereunto set my hand and seal in the presence of two witnesses.

JOHN LEONARD KELLOGG. [L. S.]

Witnesses:
C. H. HUGHES,
E. J. CROXON.